US012779956B2

(12) United States Patent
Salas et al.

(10) Patent No.: US 12,779,956 B2
(45) Date of Patent: Nov. 3, 2026

(54) WINDSHIELD SHADING CURTAIN DEVICE

(71) Applicants: David Salas, South El Monte, CA (US); Maria Salas, South El Monte, CA (US)

(72) Inventors: David Salas, South El Monte, CA (US); Maria Salas, South El Monte, CA (US)

(*) Notice: Subject to any disclaimer, the term of this patent is extended or adjusted under 35 U.S.C. 154(b) by 234 days.

(21) Appl. No.: 18/814,544

(22) Filed: Aug. 25, 2024

(65) Prior Publication Data

US 2026/0054553 A1 Feb. 26, 2026

(51) Int. Cl.
*B60J 3/06* (2006.01)
*B60J 3/02* (2006.01)

(52) U.S. Cl.
CPC ............... *B60J 3/0243* (2013.01); *B60J 3/06* (2013.01); *B60Y 2200/148* (2013.01)

(58) Field of Classification Search
USPC .................................... 296/97.8; 160/370.21
See application file for complete search history.

(56) References Cited

U.S. PATENT DOCUMENTS 2,237,565 A 4/1941 Land
2,491,765 A 12/1949 Rambo
4,226,460 A * 10/1980 Schmidt ............... B62D 35/001 296/37.7
4,790,591 A 12/1988 Miller
5,676,189 A * 10/1997 Zeeb ...................... B60J 1/2011 248/265
7,232,176 B1 6/2007 Dopwell
D733,020 S 6/2015 Queen
11,724,574 B2 * 8/2023 Berne .................... B60J 1/2011 348/148
12,545,085 B2 * 2/2026 Oakley .................. B60J 1/2011
2017/0256612 A1 9/2017 Guillorn et al.
2020/0238806 A1 7/2020 Klein
2021/0252954 A1 8/2021 Abraham

FOREIGN PATENT DOCUMENTS

WO WO2020113155 6/2020

* cited by examiner

*Primary Examiner* — Joseph D. Pape

(57) ABSTRACT

A windshield shading curtain device for protecting a driver of a vehicle from ultraviolet light includes a vehicle that has a cab and a windshield and a curtain rail extending along a full width of the windshield. A curtain is slidably attached to the curtain rail thereby enabling the curtain to hang in front of the windshield of the vehicle. The curtain is comprised of a translucent material to enable a driver to see through the curtain. The curtain is comprised of an ultraviolet light blocking to protect the driver from ultraviolet light. Additionally, a polarizing layer is applied to the curtain to polarize the light passing through the polarizing layer thereby protecting the driver's vision from glare produced by headlights of oncoming vehicles or other sources of light.

7 Claims, 5 Drawing Sheets

WINDSHIELD SHADING CURTAIN DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to windshield curtain devices and more particularly pertains to a new windshield curtain device for protecting a driver of a vehicle from ultraviolet light and for reducing glare. The device includes a curtain rail which extends across a windshield of a vehicle and a curtain that is slidably attached to the curtain rail. The curtain is comprised of a translucent material to enable the driver to see through the curtain and the curtain is comprised of an ultraviolet light blocking material to protect the driver from ultraviolet light. Additionally, the device includes a polarizing layer that is applied to the curtain for polarizing light that passes through the curtain to reduce glare for the driver.

(2) Description of Related Art Including Information Disclosed Under 37 CFR 1.97 and 1.98

The prior art relates to windshield curtain devices including a polarizing visor device that includes a visor which is pivotally disposed in a vehicle for polarizing light passing through a windshield of the vehicle and a variety of retractable window curtain devices that each at least includes a retracting mechanism positioned over a window of a vehicle and a curtain, comprised of a light polarizing material, which is disposed in the retracting mechanism which can be deployed to cover the window for reducing glare and a variety of window shade devices that each at least includes a window shade and couplers attached to the window shade for removably attaching the window shade to a window of a vehicle. In no instance does the prior art disclose a window shading curtain device that includes a curtain rail in a vehicle and a curtain, which is comprised of a translucent and ultraviolet light blocking material, which is slidably attached to the curtain rail to enable the curtain to be extended across a partial width of a windshield of the vehicle and a polarizing layer applied to the curtain for reducing glare.

BRIEF SUMMARY OF THE INVENTION

An embodiment of the disclosure meets the needs presented above by generally comprising a vehicle that has a cab and a windshield and a curtain rail extending along a full width of the windshield. A curtain is slidably attached to the curtain rail thereby enabling the curtain to hang in front of the windshield of the vehicle. The curtain is comprised of a translucent material to enable a driver to see through the curtain. The curtain is comprised of an ultraviolet light blocking to protect the driver from ultraviolet light. Additionally, a polarizing layer is applied to the curtain to polarize the light passing through the polarizing layer thereby protecting the driver's vision from glare produced by headlights of oncoming vehicles or other sources of light.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
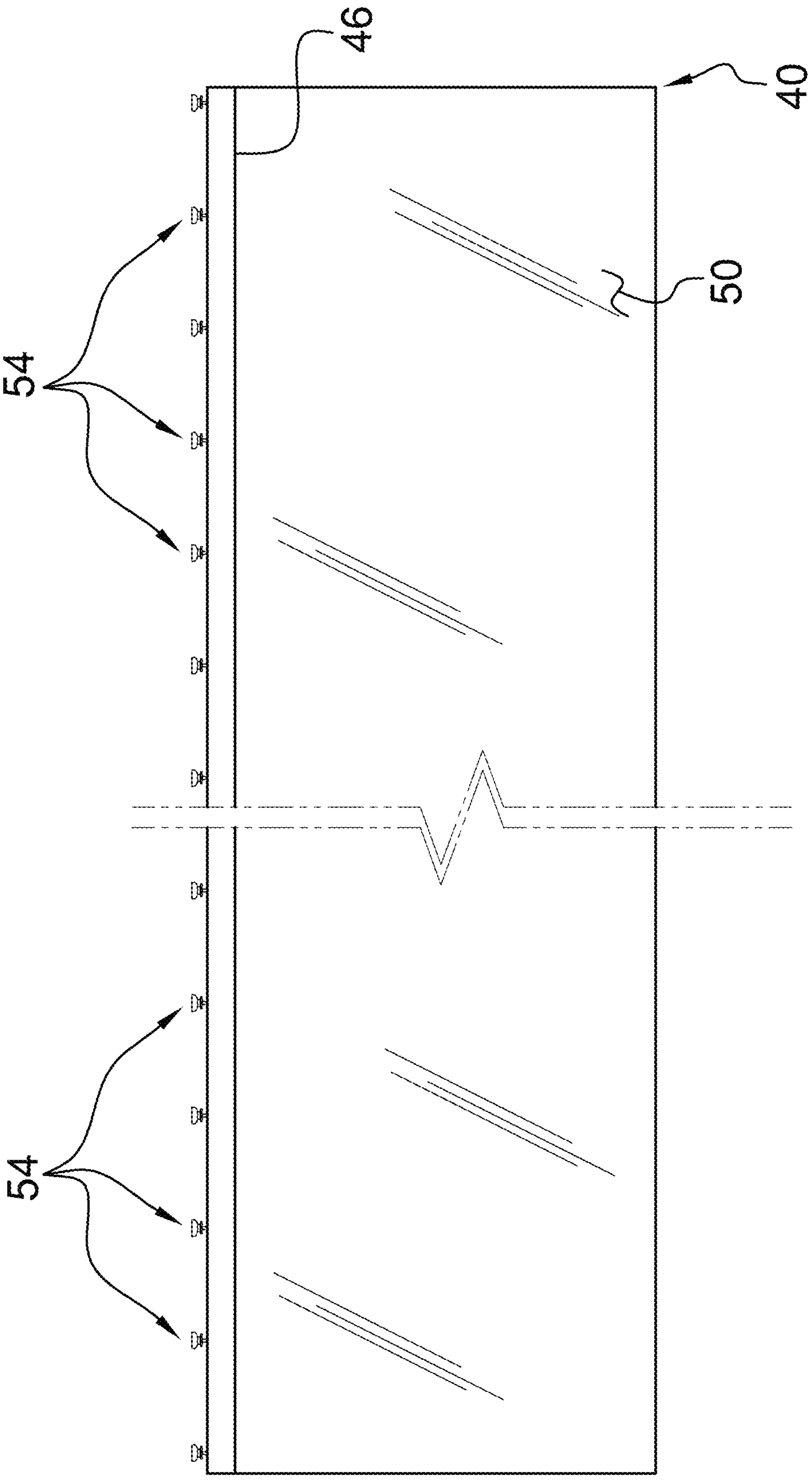
FIG. 1 is a front view of a curtain of an embodiment of the disclosure.
Figure 2:
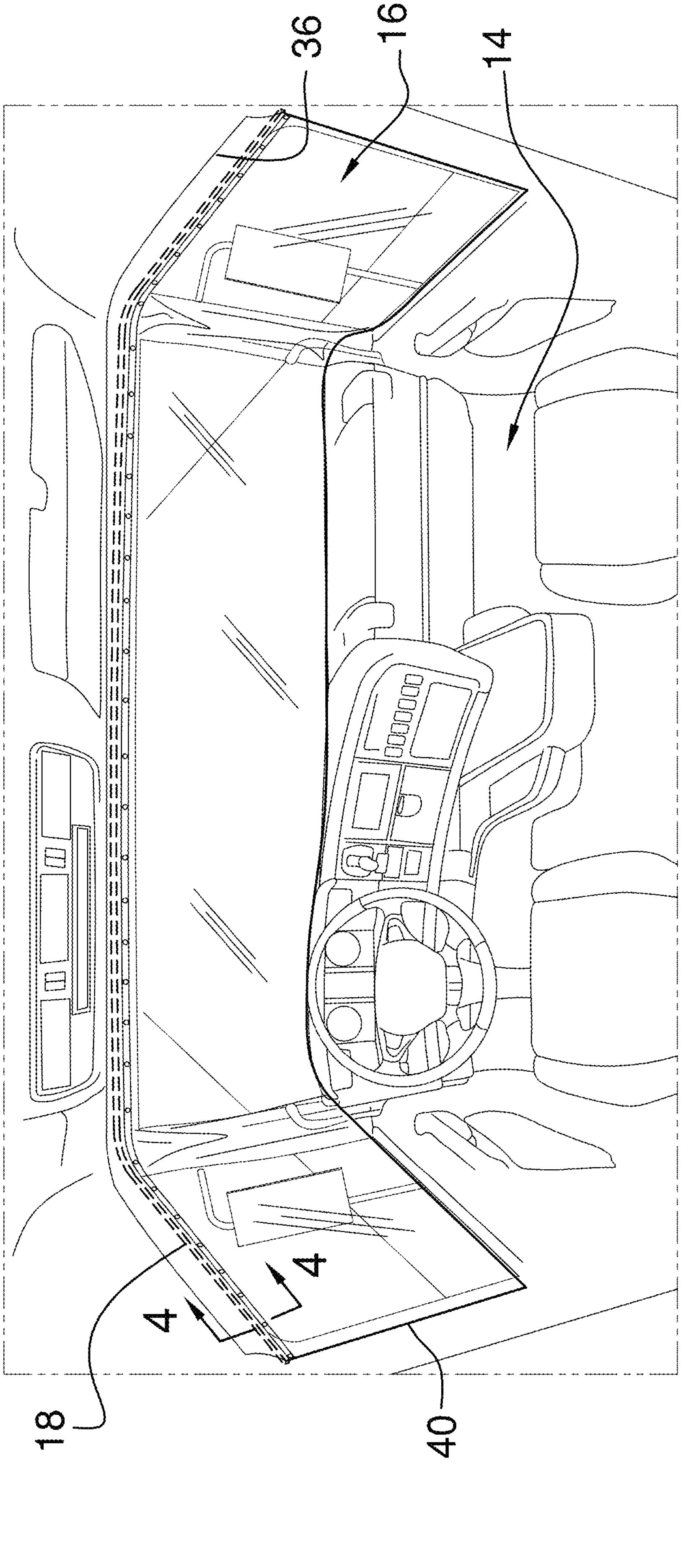
FIG. 2 is an interior in-use view of an embodiment of the disclosure.
Figure 3:
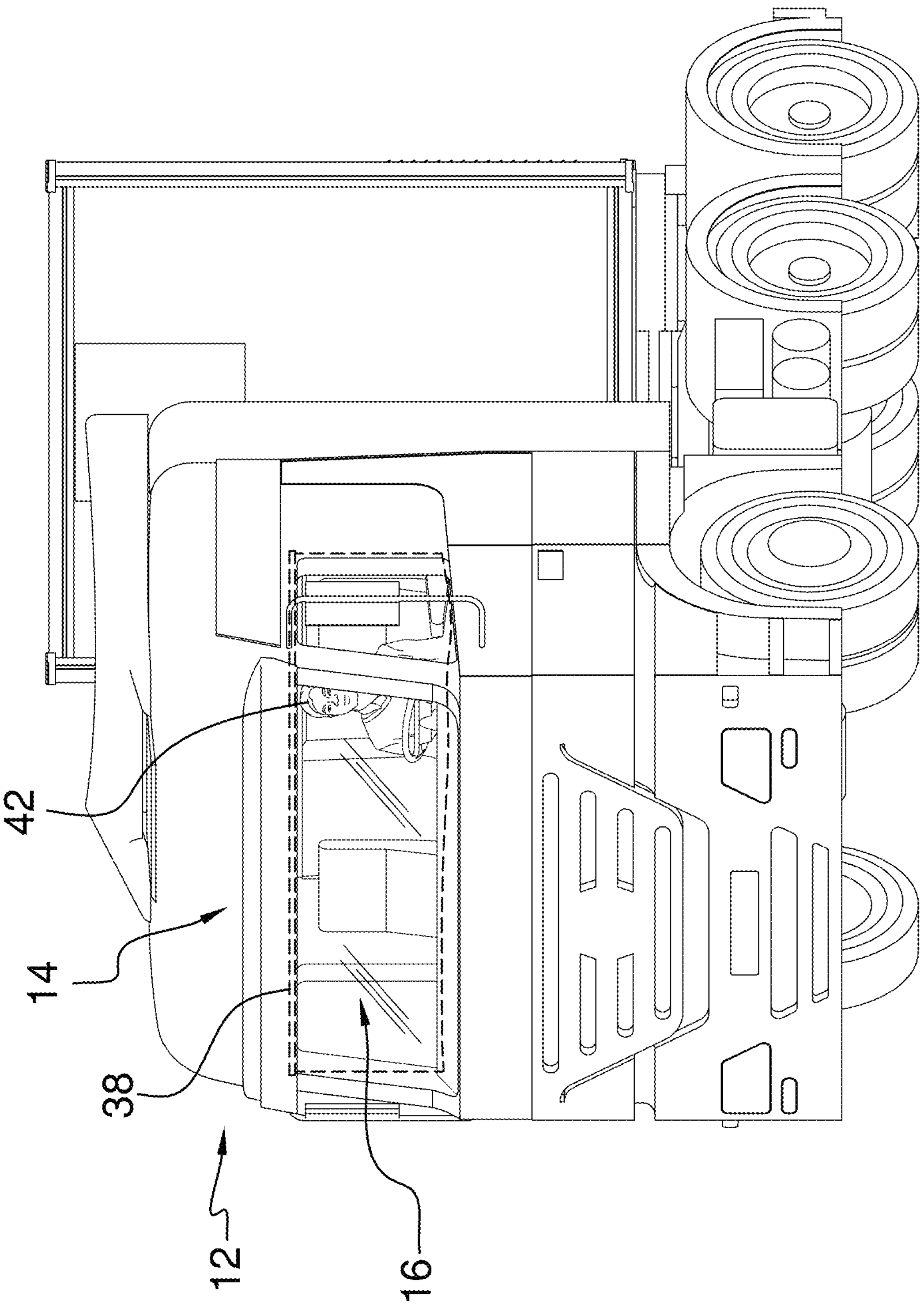
FIG. 3 is an exterior in-use view of an embodiment of the disclosure.
Figure 4:
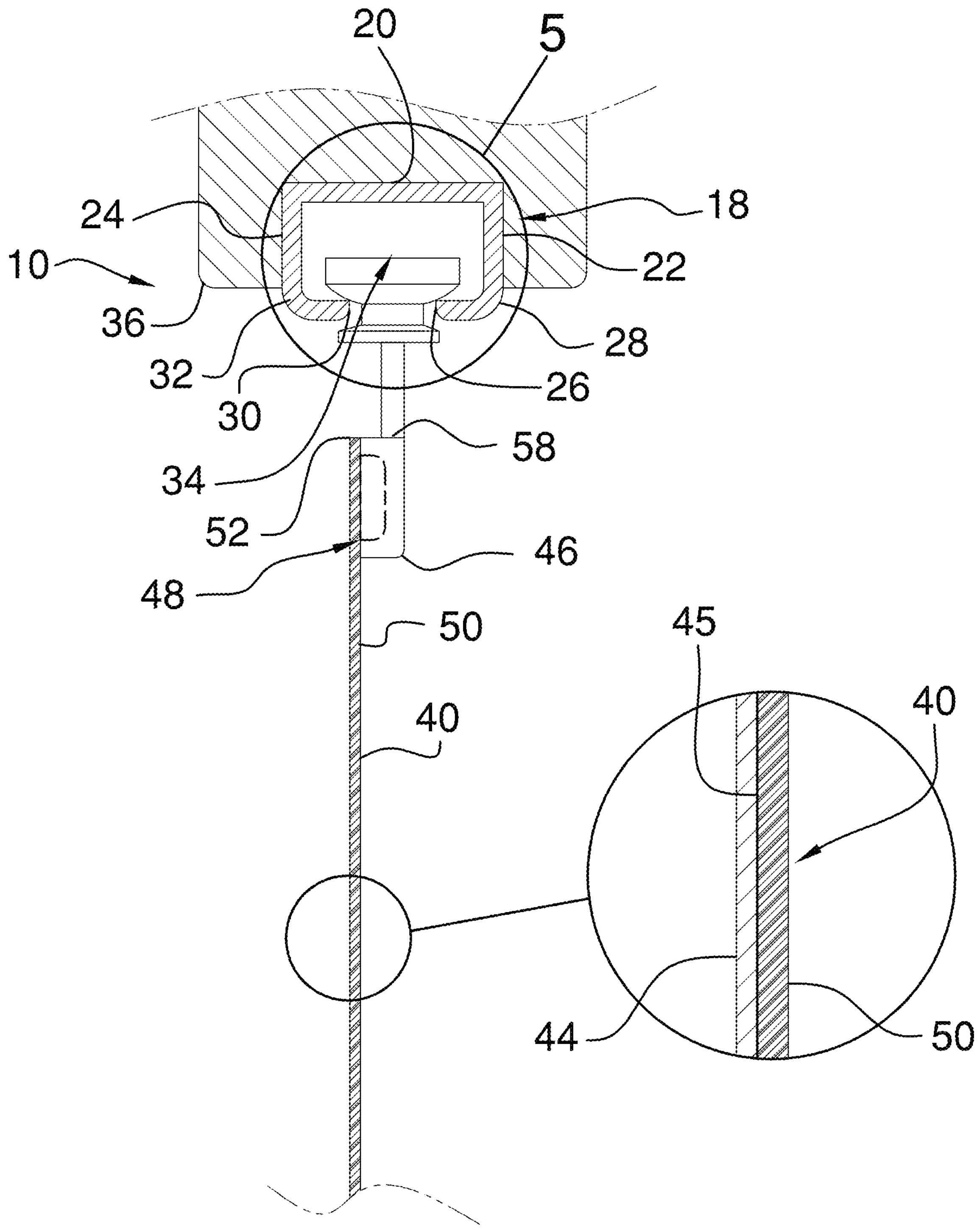
FIG. 4 is a cross sectional view taken along line 4-4 of FIG. 2 of a windshield shading curtain device according to an embodiment of the disclosure.
Figure 5:
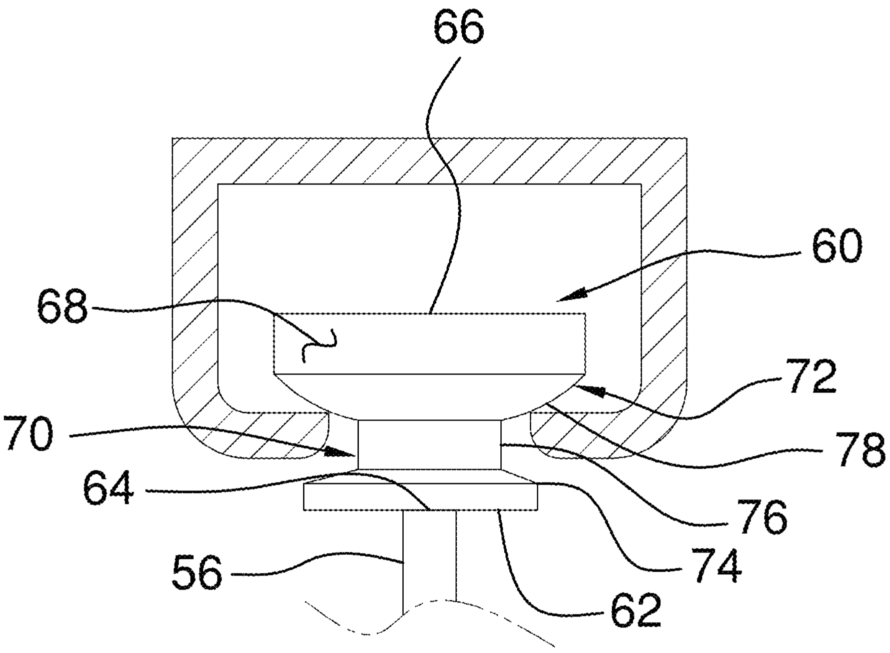
FIG. 5 is a magnified detail view taken from circle 5 of FIG. 4 of an embodiment of the disclosure.

With reference now to the drawings, and in particular to FIGS. 1 through 5 thereof, a new windshield curtain device embodying the principles and concepts of an embodiment of the disclosure and generally designated by the reference numeral 10 will be described.

As best illustrated in FIGS. 1 through 5, the windshield shading curtain device 10 generally comprises a vehicle 12 that has a cab 14 and a windshield 16 and the vehicle 12 includes a curtain rail 18 which is disposed within the cab 14 and extends along a full width of the windshield 16. The vehicle 12 may be a commercial cargo vehicle, such as a semi tractor for example, or other type of over the road cargo vehicle which is commonly driven on public roadways. The curtain rail 18 includes a top wall 20 and a front wall 22 and a back wall 24 each extending downwardly from the top wall 20. The front wall 22 and the back wall 24 are oriented parallel to each other such that the curtain rail 18 has a U-shape.

The front wall 22 has a bottom edge 26 and a bend 28 which is spaced from and is coextensive with the bottom edge 26 such that the bottom edge 26 is directed toward the back wall 24. Additionally, the back wall 24 has a bottom edge 30 and a bend 32 which is spaced from and is coextensive with the bottom edge 30 of the back wall 24 such that the bottom edge 30 of the back wall 24 is directed toward the front wall 22. In this way an opening 34 is defined between the bottom edge 26 of the front wall 22 of the curtain rail 18 and the bottom edge 30 of the back wall 24 of the curtain rail 18. The top wall 20 of the curtain rail 18 is attached to a ceiling 36 of the cab 14 such that the opening 34 defined in the curtain rail 18 faces downwardly. Furthermore, the curtain rail 18 is aligned with an upper edge 38 of the windshield 16 and the curtain rail 18 is spaced from and is oriented parallel to the upper edge 38 of the windshield 16.

A curtain 40 is slidably attached to the curtain rail 18 thereby enabling the curtain 40 to hang in front of the windshield 16 of the vehicle 12. The curtain 40 is comprised of a translucent material to pass light through the curtain 40 thereby enabling a driver 42 to see through the curtain 40. Additionally, the curtain 40 is comprised of an ultraviolet light blocking material to inhibit ultraviolet light from passing through the curtain 40 thereby enabling the driver 42 to be protected from ultraviolet light which passes through the windshield 16. In this way the driver 42 can be protected from becoming sunburned as well as being protected from the cancer causing effects of long term exposure to ultraviolet light. Furthermore, the curtain 40 has a polarizing layer 44 which is applied to a back surface 45 of the curtain 40 and the polarizing layer 44 is comprised of a light polarizing material. In this way the polarizing layer 44 polarizes the light passing through the polarizing layer 44 thereby protecting the driver's 42 vision from glare produced by headlights of oncoming vehicles or other sources of light.

The curtain 40 has a length which is sufficient to extend across a partial width of the windshield 16. In this way the curtain 40 enables the driver 42 to be shaded from ultraviolet light which passes through a portion of the windshield 16. The curtain 40 is comprised of a deformable material, including but not being limited to translucent vinyl or translucent polyester, thereby enabling the windshield 16 to be collapsed to extend across a reduced width of the windshield 16. In this way the curtain 40 enables to driver 42 to position the curtain 40 at a selected point along the windshield 16. For example, the curtain 40 can be positioned at a corner of the cab 14 where an outside mirror of the vehicle 12 and a door post of the vehicle 12 are aligned. In this way the curtain 40 can be oriented to shade sunlight produced from either sunrise or sunset, for example. The curtain 40 may have a width ranging between approximately 80.0 cm and 100.0 cm and a height ranging between approximately 60.0 cm and 70.0 cm.

A mounting member 46 is provided which has a rear side 48 that is bonded to a back surface 50 of the curtain 40. The mounting member 46 is aligned with a top edge 52 of the curtain 40 and the mounting member 46 is elongated to extend along a full width of the top edge 52 of the curtain 40. A plurality of couplers 54 is provided and each of the plurality of couplers 54 includes a stem 56 which is coupled to and extends upwardly from a top side 58 of the mounting member 46. Additionally, the stem 56 of each of the plurality of couplers 54 is evenly spaced apart from each other and is distributed along a full length of the top side 58 of the mounting member 46.

Each of the plurality of couplers 54 includes a head 60 which has a lower surface 62 that is attached to a top end 64 of the stem 56. The head 60 associated with each of the plurality of couplers 54 has a top surface 66 and an outer surface 68 extending between the top surface 66 and the lower surface 62. Furthermore, the outer surface 68 of the head 60 associated with each of the plurality of couplers 54 has a depression 70 extending around a full circumference of the outer surface 68. The depression 70 in the outer surface 68 of the head 60 associated with each of the plurality of couplers 54 has a bounding surface 72 which has a lower side 74 sloping upwardly to intersect a middle side 76 and an upper side 78 curving upwardly from an intersection with the middle side 76.

The depression 70 in the outer surface 68 of the head 60 associated with each of the plurality of couplers 54 receives the bottom edge 26 of the front wall 22 of the curtain rail 18 and the bottom edge 30 of the back wall 24 of the curtain rail 18. In this way the head 60 associated with each of the plurality of couplers 54 is slidably engaged to the curtain rail 18 having the head 60 associated with each of the plurality of couplers 54 being positioned in the opening 34 defined in the curtain rail 18. Furthermore, the head 60 associated with each of the plurality of couplers 54 is slidable along a full length of the curtain rail 18 for either collapsing the curtain 40 to extend across a reduced width of the windshield 16 or extending the curtain 40 to extend along a greater width of the windshield 16.

In use, the curtain 40 is positioned to extend along a desired section of the windshield 16 in order to enable the driver 42 to shade themselves from sunlight. In this way the curtain 40 protects the driver 42 from ultraviolet light and glare while enabling the driver 42 to see through the curtain 40. Thus, the driver 42 can be protected from the cancer causing effects of long term exposure to ultraviolet light without negatively impacting the driver's 42 visibility while driving the vehicle 12. Furthermore, the polarizing layer 44 polarizes sunlight that passes through the curtain 40. In this way the curtain 40 can reduce glare from headlights of oncoming vehicles at night, for example, or other sources of bright light during nighttime driving conditions thereby enhancing the driver's 42 visibility at night.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A windshield shading curtain device for shading a driver of a vehicle from sunlight thereby enhancing visibility for the driver, said device comprising:

a vehicle having a cab and a windshield, said vehicle including a curtain rail being disposed within said cab and extending along a full width of said windshield; and a curtain being slidably attached to said curtain rail thereby enabling said curtain to hang in front of said windshield of said vehicle, said curtain being comprised of a translucent material wherein said curtain is configured to pass light through said curtain thereby enabling a driver to see through said curtain, said curtain being comprised of an ultraviolet light blocking material wherein said curtain is configured to inhibit ultraviolet light from passing through said curtain thereby enabling the driver to be protected from ultraviolet light which passes through said windshield, said curtain having a polarizing layer being applied to said curtain, said polarizing layer being comprised of a light polarizing material wherein said polarizing layer is configured to polarize the light passing through said polarizing layer thereby protecting the driver's vision from glare produced by headlights of oncoming vehicles or other sources of light, said curtain having a length being sufficient to extend across a partial width of said windshield wherein said curtain is configured to enable the driver to be shaded from ultraviolet light which passes through a portion of said windshield, said curtain being comprised of a deformable material thereby enabling said curtain to be collapsed to extend across a reduced width of said windshield wherein said curtain is configured to enable the driver to position said curtain at a selected point along said windshield.

2. The device according to claim 1, wherein:

said device includes a mounting member having a rear side being bonded to a back surface of said curtain;

said mounting member is aligned with a top edge of said curtain; and said mounting member is elongated to extend along a full width of said top edge of said curtain.

3. The device according to claim 2, wherein:

said device includes a plurality of couplers;

each of said plurality of couplers includes a stem being coupled to and extending upwardly from a top side of said mounting member; and said stem of each of said plurality of couplers is evenly spaced apart from each other and is distributed along a full length of said top side of said mounting member.

4. The device according to claim 3, wherein:

each of said plurality of couplers includes a head having a lower surface being attached to a top end of said stem;

said head associated with each of said plurality of couplers has a top surface and an outer surface extending between said top surface and said lower surface;

said outer surface of said head associated with each of said plurality of couplers has a depression extending around a full circumference of said outer surface; and said depression in said outer surface of said head associated with each of said plurality of couplers has a bounding surface which has a lower side sloping upwardly to intersect a middle side and an upper side curving upwardly from an intersection with said middle side.

5. The device according to claim 1, wherein:

said curtain rail includes a top wall and a front wall and a back wall each extending downwardly from said top wall;

said front wall and said back wall are oriented parallel to each other such that said curtain rail has a U-shape;

said front wall has a bottom edge and a bend being spaced from and being coextensive with said bottom edge such that said bottom edge is directed toward said back wall;

said back wall has a bottom edge and a bend being spaced from and being coextensive with said bottom edge of said back wall such that said bottom edge of said back wall is directed toward said front wall;

an opening is defined between said bottom edge of said front wall of said curtain rail and said bottom edge of said back wall of said curtain rail;

said top wall of said curtain rail is attached to a ceiling of said cab such that said opening defined in said curtain rail faces downwardly;

said curtain rail is aligned with an upper edge of said windshield;

said curtain rail is spaced from and is oriented parallel to said upper edge of said windshield;

said device includes a plurality of couplers each being disposed on said curtain;

each of said plurality of couplers includes a head having a depression in an outer surface of said plurality of couplers; and said depression in said outer surface of said head associated with each of said plurality of couplers receives said bottom edge of said front wall of said curtain rail and said bottom edge of said back wall of said curtain rail thereby enabling said head associated with each of said plurality of couplers to be slidably engaged to said curtain rail having said head associated with each of said plurality of couplers being positioned in said opening defined in said curtain rail.

6. The device according to claim 5, wherein said head associated with each of said plurality of couplers is slidable along a full length of said curtain rail for either collapsing said curtain to extend across a reduced width of said windshield or extending said curtain along a greater width of said windshield.

7. A windshield shading curtain device for shading a driver of a vehicle from sunlight thereby enhancing visibility for the driver, said device comprising:

a vehicle having a cab and a windshield, said vehicle including a curtain rail being disposed within said cab and extending along a full width of said windshield, said curtain rail including a top wall and a front wall and a back wall each extending downwardly from said top wall, said front wall and said back wall being oriented parallel to each other such that said curtain rail has a U-shape, said front wall having a bottom edge and a bend being spaced from and being coextensive with said bottom edge such that said bottom edge is directed toward said back wall, said back wall having a bottom edge and a bend being spaced from and being coextensive with said bottom edge of said back wall such that said bottom edge of said back wall is directed toward said front wall;

wherein an opening is defined between said bottom edge of said front wall of said curtain rail and said bottom edge of said back wall of said curtain rail;

wherein said top wall of said curtain rail is attached to a ceiling of said cab such that said opening defined in said curtain rail faces downwardly, said curtain rail being aligned with an upper edge of said windshield, said curtain rail being spaced from and being oriented parallel to said upper edge of said windshield;

a curtain being slidably attached to said curtain rail thereby enabling said curtain to hang in front of said windshield of said vehicle, said curtain being comprised of a translucent material wherein said curtain is configured to pass light through said curtain thereby enabling a driver to see through said curtain, said curtain being comprised of an ultraviolet light blocking material wherein said curtain is configured to inhibit ultraviolet light from passing through said curtain thereby enabling the driver to be protected from ultraviolet light which passes through said windshield, said curtain having a polarizing layer being applied to said curtain, said polarizing layer being comprised of a light polarizing material wherein said polarizing layer is configured to polarize the light passing through said polarizing layer thereby protecting the driver's vision from glare produced by headlights of oncoming vehicles or other sources of light, said curtain having a length being sufficient to extend across a partial width of said windshield wherein said curtain is configured to enable the driver to be shaded from ultraviolet light which passes through a portion of said windshield, said curtain being comprised of a deformable material thereby enabling said curtain to be collapsed to extend across a reduced width of said windshield wherein said curtain is configured to enable the driver to position said curtain at a selected point along said windshield;

a mounting member having a rear side being bonded to a back surface of said curtain, said mounting member being aligned with a top edge of said curtain, said mounting member being elongated to extend along a full width of said top edge of said curtain;

a plurality of couplers, each of said plurality of couplers including a stem being coupled to and extending upwardly from a top side of said mounting member, said stem of each of said plurality of couplers being evenly spaced apart from each other and being distributed along a full length of said top side of said mounting member, each of said plurality of couplers including a head having a lower surface being attached to a top end of said stem, said head associated with each of said plurality of couplers having a top surface and an outer surface extending between said top surface and said lower surface, said outer surface of said head associated with each of said plurality of couplers having a depression extending around a full circumference of said outer surface, said depression in said outer surface of said head associated with each of said plurality of couplers having a bounding surface which has a lower side sloping upwardly to intersect a middle side and an upper side curving upwardly from an intersection with said middle side, said depression in said outer surface of said head associated with each of said plurality of couplers receiving said bottom edge of said front wall of said curtain rail and said bottom edge of said back wall of said curtain rail thereby enabling said head associated with each of said plurality of couplers to be slidably engaged to said curtain rail having said head associated with each of said plurality of couplers being positioned in said opening defined in said curtain rail, said head associated with each of said plurality of couplers being slidable along a full length of said curtain rail for either collapsing said curtain to extend across a reduced width of said windshield or extending said curtain along a greater width of said windshield.

* * * * *